Patented Feb. 10, 1942

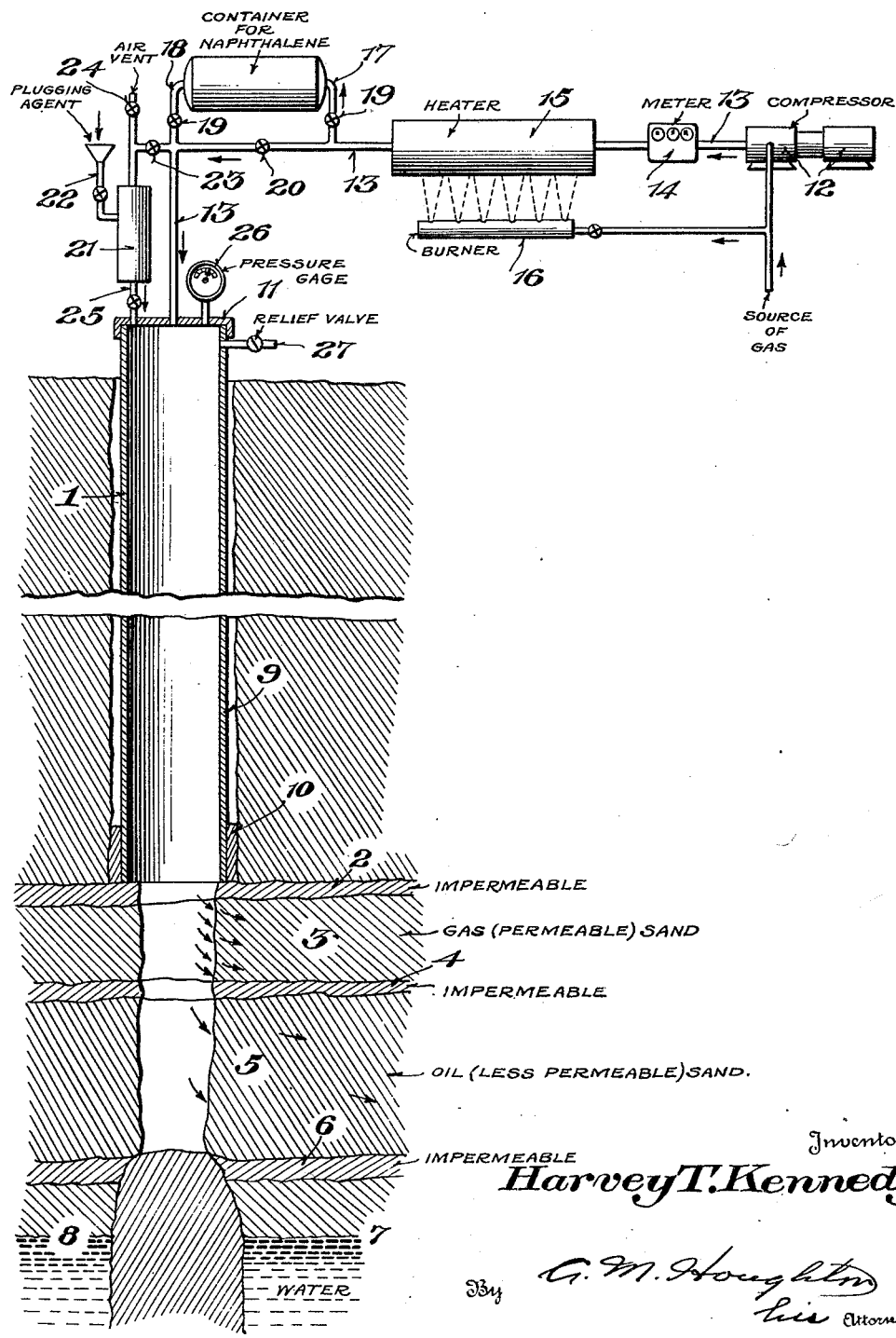

2,272,673

UNITED STATES PATENT OFFICE 2,272,673

GAS REPRESSURING OF OIL FIELDS

Harvey T. Kennedy, Forest Hills, Pa., assignor to Gulf Research & Development Company, Pittsburgh, Pa., a corporation of Delaware Application March 24, 1936, Serial No. 70,693

7 Claims. (Cl. 166—21)

This invention relates to gas repressuring of oil fields; and it comprises a method of increasing flow of oil into a production well from strata of varying permeabilities wherein gas is forced under pressure through an input well into the different strata to displace oil therefrom and an impregnating material adapted to reduce the permeability of the strata is injected into the strata through one of said wells in such a manner that the flow of gas through the more permeable strata is obstructed in greater degree than is the flow of oil through the less permeable oil-producing strata and by-passing of gas through the more permeable strata is diminished, thus raising the ratio of oil produced to gas expended, the pressure under which the gas is forced into the strata being advantageously increased after the injection of said impregnating material; all as more fully hereinafter set forth and as claimed.

At present there are various proposed methods by which oil may be recovered from depleted oil fields where oil no longer flows in commercial quantity into the production wells. Of these, that most generally used is the frequently referred to Smith-Dunn gas drive or repressuring method, in which gas under pressure is applied to the field through one or more input wells. The gas entering the region surrounding each input well drives oil into other neighboring wells from which it may be recovered. The input wells are usually located in proper relation to neighboring production wells and may be available non-flowing wells.

In most oil-bearing reservoirs the oil occurs in a plurality of superimposed strata of varying permeability separated by impervious layers of shale or the like, and when gas-drive is applied the oil will often be found to flow into a production well for a certain length of time without abnormal quantities of gas. As production proceeds however the flow of gas from the input well through the strata increases and the compressors must supply a greater amount of gas to the strata to keep up the pressure and the rate of oil production. The flow of gas from the input well at first quickly displaces oil in the more permeable strata leaving channels through which the gas by-passes. The by-passing gas does no useful work and the ratio of oil produced to gas supplied becomes low; there is a low return in oil for the energy expended in gas pumping. As succeeding and less permeable strata become open channels in turn, by-passing increases and the ratio of gas injected to oil produced progressively increases. Higher gas pressures, if applied to the input well increase the gas-oil ratio still further, and the compressor capacity required per barrel of oil becomes prohibitive long before all the oil obtainable by my method is exhausted.

The present invention provides an improved gas drive method in which by-passing is diminished, more of the gas applied through the input well doing useful work in expelling oil from the strata and a minimum amount of gas per unit of oil is required. For a compressor unit with a given pumping capacity a maximum pressure may be maintained on the oil present in the stratum, with expulsion of oil at a maximum rate.

According to this invention a method is provided for diminishing by-passing of gas through oil-depleted strata in producing zones.

In securing these advantageous results an impregnating material adapted to decrease or prevent the flow of gas through a stratum is injected into the strata; injection beginning as soon as by-passing is observed. The impregnating material is usually injected through an input well. The material is sometimes introduced into the strata simultaneously with the gas, sometimes introduction is from time to time, between applications of gas under pressure. In some instances the material is injected into the gas stream and is carried therewith into the strata. Details of injection methods vary with the material used and local conditions. Often one treatment is sufficient to increase the oil-gas ratio the desired amount but sometimes further treatment is necessary.

By applying the present method in some cases depleted strata and strata delivering oil to the production wells are sometimes both impregnated to varying degrees, because of the indiscriminate injection of the sealing agent into the well, but reduction in the volume of gas pumped per barrel of oil will still result, because the flow of gas through a by-passing stratum will be proportionately more reduced than through an oil-bearing stratum. More of the injected material will find its way into the by-passing channel than through the oil-bearing strata as the resistance to flow through the former is less than through the latter.

My improved method may be advantageously used after the Smith-Dunn process has become uneconomical. When applying the Smith-Dunn process to an input well connected to a production well by two or more strata of varying permeabilities, the most permeable strata are substantially depleted of oil after a time and convey large quantities of gas from the input well to the production well without expelling any appreciable quantity of oil. In such a process and under the conditions stated the total amount of gas required to produce a sufficient flow of oil into the production well increases to such an extent as to make further application of this method unprofitable. There is loss of gas through the more permeable strata. Substantially all of the pressure drop across the more permeable strata is concentrated around the input and production wells as the gas, being of exceedingly low viscosity, meets little resistance to flow in the strata themselves. But the pressure drop through the less permeable strata is due almost entirely to the resistance of the more viscous oil moving therethrough, rather than to the resistance to gas flow of the depleted portion of a stratum. Hence, in the less permeable strata the pressure drop is practically uniform across that portion containing oil.

When such conditions exist as are described, or at any time after bypassing of gas has become a factor, the present invention is applicable. An impregnating material is then introduced into the strata through the input well in a manner calculated to impregnate the looser strata while minimizing the impregnation of the less permeable, oil bearing strata. The resulting partial obstruction of the depleted portion of the second stratum makes a relatively minute difference in oil flow because the pressure drop in this stratum occurs in the part containing oil. On the other hand the impregnation of the first stratum results entirely in increased resistance to flow of gas through this stratum and such flow is consequently diminished. By the application of my method the portion of the total pressure drop between the input well and the production well which is due to waste gas flow is therefore greatly diminished, and likewise the portion of the pressure drop due to useful work being done is greatly increased. Subsequent to the injection of impregnating material the pressure under which the gas is being applied is preferably raised, with a consequent increase in the rate of oil production. The gas pressure is increased without changing the capacity of the compressor; this being made possible by the reduction of pressure losses due to by-passing.

There are many materials suitable for decreasing permeability of the strata within the purview of my invention and there are many ways in which my process can be carried out.

The material may be a liquid, solid, or gas or it may be any combination of the three such as a suspension of solids in a liquid, or an aerosol.

According to one modification of the present invention, after by-passing of gas has commenced a liquid suspension of finely divided solids such as cement or clay is injected into strata surrounding the input well. When the gas under pressure is subsequently applied to the strata through the input well the gas-oil ratio is decreased and by-passing of the gas is diminished.

By-passing is diminished by injecting into the strata a solution of a salt which reacts to form a precipitate with materials present in the rock strata, or reacts similarly with another solution subsequently or previously injected. If calcium carbonate is present in the strata the material injected may be a solution of one or more of the salts (such as the sulfates or chlorids) of such metals as antimony, magnesium, iron, arsenic, aluminum and the like which react with calcium carbonate or with their solvent liquid in the presence of calcium carbonate to form a precipitate. It is often desirable to separately inject two or more different solutions which react with each other within the strata to form a precipitate. Accordingly such solutions may be chosen from precipitating pairs such for example as sodium sulfate-calcium chlorid, borax-magnesium chlorid, sodium carbonate-calcium chlorid, or sodium carbonate-magnesium chlorid.

Another application of my method is the injection of viscous or semi-fluid liquids between intervals of gas pressuring or continuously during gas pressuring. Advantageously in so doing, I pump into an input well a portion of the oil taken out of the producing wells, the oil thus pumped being returned through the strata to the producing wells together with an increased amount of new oil. Alternatively, the injected fluid may be an oil either more or less viscous than that being produced in the field. Tank bottoms or emulsified oils which have less value than the oil ordinarily produced are suitable liquids. The passage through the strata will often destroy such an emulsion, resulting in clean oil, thus accomplishing the double purpose of increasing the oil production and breaking the emulsion.

Still another manner of applying my method is to pump into the strata, in addition to the gas, solutions of solid or semi-solid materials in which the solvent is volatile at oil field temperatures. Such a solution may advantageously consist of a volatile hydrocarbon such as gasoline, natural or casing head gasoline or the condensed vapors therefrom with a material such as paraffine which is solid at the reservoir temperature, dissolved in it. When a solution of this type is injected into the strata through a well a greater part of it follows the strata through which gas has been channeling or by-passing because these strata are more permeable and because they are filled throughout their volume with gas which offres less resistance to flow than oil. Advantageously a solution of this type is injected into the input well in such a quantity that little or none of it will reach the production well and the solvent will be evaporated by gas subsequently forced into the strata through the input well thereby leaving the solid or semi-solid solute in by-passing channels. According to this form of the invention any solution that finds its way into oil bearing strata will not be evaporated by subsequently injected gas since gas enters these strata only to the extent that oil is being expelled, which is negligible in most cases. It is therefore possible, to diminish the flow of gas through by-passing channels without causing any reduction in the flow of oil.

Other materials which may be injected into the strata are fused solids or semi-solids such as paraffin, sulfur, asphalt, tar, or like material which solidify at a temperature above that prevailing in the strata. The fused material is advantageously superheated to a temperature considerably above its melting point before injection and, if necessary, it may be maintained at a high temperature in the well prior to injection by means of electric heaters, steam coils or the like.

According to another way the vapors of naphthalene or a similar material, which on entering the strata and cooling therein are condensed to a solid, are injected into the gas stream on its way to the input well and carried with the gas into the strata. The gas used for repressuring may be heated prior to entering the input well in order to diminish condensation of the naphthalene or like vapors before entering the strata.

In the accompanying drawing I have illustrated, more or less diagrammatically, one combination of apparatus elements useful in the performance of the process of my invention.

In the drawing, the figure illustrates an input well equipped for supplying gas under pressure to various strata in an oil producing formation in order to repressure the strata, together with means for injecting plugging agents to plug the strata according to the method of my invention. Production wells (not shown) are located at intervals in the territory around the input well.

Referring to the drawing, reference character 1 indicates, in general, a well or bore which in its lower portion, penetrates in downward order an impermeable rock stratum 2, a highly permeable sand 3 depleted of oil, an impervious layer of shale 4, a stratum of oil sand 5 of less permeability than stratum 3, an impermeable layer 6 and a water-producing sand 7. This array of strata is given merely by way of illustration; oil field conditions of course have many modifications. At the base of the bore 1, the water has been shut off or kept from entering the bore by means of a cement plug 8. The well is cased down to the producing formation with a casing 9 resting on rock stratum 2, the casing being sealed by means of a packer or cement plug 10. At the top, the casing is closed by a casing head 11. A compressor 12, taking gas from any source (conveniently natural gas from adjacent wells) supplies this gas under pressure to conduit 13 leading to the interior of input well casing 9. From the input well the gas flows through the surrounding strata to the production wells. That portion of gas flowing through depleted stratum 3 is wasted, while the gas flowing through oil-bearing stratum 5 carries with it some oil which is ultimately delivered to the production wells. Adjacent the compressor 12 is positioned a recording flow meter 14. The gas may be heated, if desired, during its flow through conduit 13 by means of a heating jacket 15 enclosing a portion of the conduit. Heat is supplied to jacket 15 from any source such as a gas burner 16. When desired, heated gas from conduit 13 may be routed via by-pass line 17 over a body of naphthalene in a container 18, when valves 19 in the by-pass are open and valve 20 in the conduit 13 is closed. In so doing, the hot gases vaporize naphthalene and the naphthalene vapors mingle with the hot input gases and are carried down the input well and into the most permeable strata 3 where they condense to form solids which plug the pores and diminish waste flow of gas.

Alternatively, liquid plugging agents or suspensions may be introduced into the input well casing 9 through a lubricator 21 having a valved passage 22 for introduction of plugging agent. The upper side of lubricator 21 communicates with conduit 13 through valved line 23 having a closable air vent 24 interposed between the valve and the top of the lubricator. The contents of lubricator 21 are discharged into the input well casing 9 through valved passage 25. The well is provided at the casing head with the usual pressure gauge 26 and relief valve 27.

Liquid plugging agents or suspensions may be introduced into the input well either simultaneously with the injection of gas under pressure or intermittently between such operations. When the introduction of plugging agent is intermittent, the pressure on the well may be maintained or released as desired.

In introducing liquids or suspensions through lubricator 21 simultaneously with injection of gas, the valves in lines 23 and 25 and the relief valve 27 are closed and the valve 20 and valves in air vent 24 and passage 22 are opened. The desired amount of plugging agent is then introduced through passage 22 into the lubricator after which the valves in air vent 24 and passage 22 are closed and the valves in lines 23 and 25 opened permitting the plugging agent to discharge into the input well while gas is flowing through conduit 13.

In introducing the plugging agents intermittently while maintaining the pressure in the input well the operation is identical to that just described with the exception that valve 20 remains closed during the operation, being opened again when gas is to be injected into the input well. When it is desirable to relieve the pressure on the input well during introduction of plugging agent, valve 20 and the valve in line 23 are closed and relief valve 27 and the valves in passage 22, air vent 24, and line 25 are opened. Plugging agent is then introduced through passage 22 after which relief valve 27 and the valve in line 25 are closed and valve 20 is again opened to inject gas into the input well under pressure.

When injecting impregnating materials according to my method, details of operation, such as pressures to be applied, quantities and choice of material, and the like, vary with the properties of the particular strata to be treated. In general, information as to the distribution of channels carrying gas, the extent to which channels carrying oil have been depleted, and the relative permeability of these strata, is lacking. I prefer, therefore, to treat the strata with small quantities of impregnating materials, until it is known that larger quantities are required. Thus, for example, if a barrel of concentrated solution of antimony trichloride is injected into the sand surrounding an input well, followed by five barrels of water, and the oil production is increased 10 per cent and gas expenditure decrease 20 per cent, it is expedient to add double these quantities. Examination of cores will determine whether they contain limestone or other calcium compounds in sufficient quantity, so that a reaction with those salts forming a precipitate with calcium compounds may be utilized as a means of obstructing the formation. If it is found that materials which form precipitates in the strata are not effective, it is probable that large channels are responsible for the excessive flow of gas, and treatment with mud mixtures, or materials such as tar or paraffin is indicated.

As an illustration of the use of this invention, I shall describe a specific instance in which the invention was applied in the field.

In a field in which production was being enhanced by gas repressuring, one input well was surrounded by four production wells. Originally, the input well had been fed gas under 100 pounds pressure at a rate of 50,000 cu. ft. per day. Taking an average from the four production wells over the first six-month period, the ratio of cubic feet of gas expended to barrels of oil produced was approximately 1000:1. During the subsequent six months the gas-oil ratio increased to approximately 1500:1; but, during the third six-month period, the ratio suddenly increased to 10,000:1, while the pressure at the input well dropped to 10 pounds, indicating that the gas was "blowing through" or by-passing the oil sand in its travel from the input well to the production wells. Production was roughly only 15 per cent as economical as before.

At this stage of operations, my invention was applied by first heating the input gases to a temperature of about 250° F. in order to heat the input well and well face, thus preventing condensation of naphthalene vapors before penetrating the strata, when introduced as hereinafter described. After several hours I introduced naphthalene vapors into the input gas with the aid of apparatus similar to that described above, the temperature of the mixture at the casing head remaining about 250° F. Over a period of 48 hours 100 pounds of naphthalene were vaporized, mingled with the hot input gases, and condensed in the by-passing strata. The introduction of naphthalene vapor was then stopped, the input well being fed 50,000 cu. ft. of gas per day without preheating. While the rate at which the gas was introduced was the same as before treatment, the pressure increased to 45 lbs., indicating that by-passing had been diminished. The gas-oil ratio was observed to decrease from 10,000:1 prior to treatment to 6000:1 after treatment, the latter ratio being still considerably greater than the gas-oil ratio before the gas started to "blow through." I subsequently repeated my treatment of the well with naphthalene by again heating the input well, after which 400 additional pounds of naphthalene were introduced into the gas stream as super-heated vapor. This material condensed in the by-passing strata and subsequently reduced the gas-oil ratio to 1200:1, the pressure at the input well rising to the original 100 pounds, while the rate of gas input was increased to 55,000 cu. ft. per day.

It is to be noted that after each introduction of naphthalene the total daily production of oil increased, while the volume of gas expended daily remained constant. After the second treatment, I increased the pressure on the input gas to 200 pounds and observed that the total daily production of oil increased 96 per cent, while the gas-oil ratio increased only to 2600:1.

I have described, for the sake of simplicity, a method of applying gas through one input well, and of injecting impregnating material into the strata through one well only. However, the same treatment may be applied to a plurality of wells and the oil expelled from the strata received in a plurality of wells and the treating material may, in some instances, be injected into the strata through a production well. The term strata has been used to denote any rock formation containing an assemblage of pores or channels or any individual pore or channel, and the term gas has been used, to include air or gas of any character, such as natural gas or gas produced from the wells.

What I claim is:

1. A process for recovering oil from porous oil well strata of varying permeabilities by forcing the oil towards an output well with the aid of gas injected under pressure into an input well, comprising injecting into said input well, upon occurence of substantial quantities of gas at the output well, impregnating material adapted to partially obstruct the pores of the several surrounding strata, said impregnating material being a vapor adapted to condense within the pores of permeable strata, and then resuming injection of gas into the input well under pressure to drive oil towards the production well, whereby the ratio of oil to gas produced at the production well is increased despite the partial obstruction of the several strata.

2. The process of claim 1 wherein the vapor is naphthalene.

3. A process for recovering oil from wells extending into subterranean strata of different permeabilities, at least one of which contains oil, which comprises the steps of establishing and maintaining an output well and an input well spaced therefrom, forcing gas down the input well to drive oil toward the output well, and injecting into the input well and into said strata a temporarily fluid, pore-penetrating sealing agent which fluid in the course of time yields a dislodgment-resisting seal in the pores of the rock, the amount of said agent injected being limited such as only partially to obstruct the strata, and resuming injection of the gas into the input well; whereby the ratio of oil to gas produced at the output well is increased.

4. A process according to claim 3 wherein said impregnating material is liquid.

5. A process according to claim 3 wherein said impregnating material is a liquid solution of a salt adapted to react with natural constituents of the strata to form a precipitate.

6. A process according to claim 3 wherein said impregnating material is a solution of at least one salt of a metal selected from a class consisting of antimony, arsenic, aluminum, iron, magnesium and bismuth.

7. A process according to claim 3 wherein said impregnating material is a solution of ferric chloride.

HARVEY T. KENNEDY.